Feb. 27, 1923.
L. L. JACKSON.
SUBLIMATION APPARATUS.
FILED JAN. 11, 1921.
1,446,564.
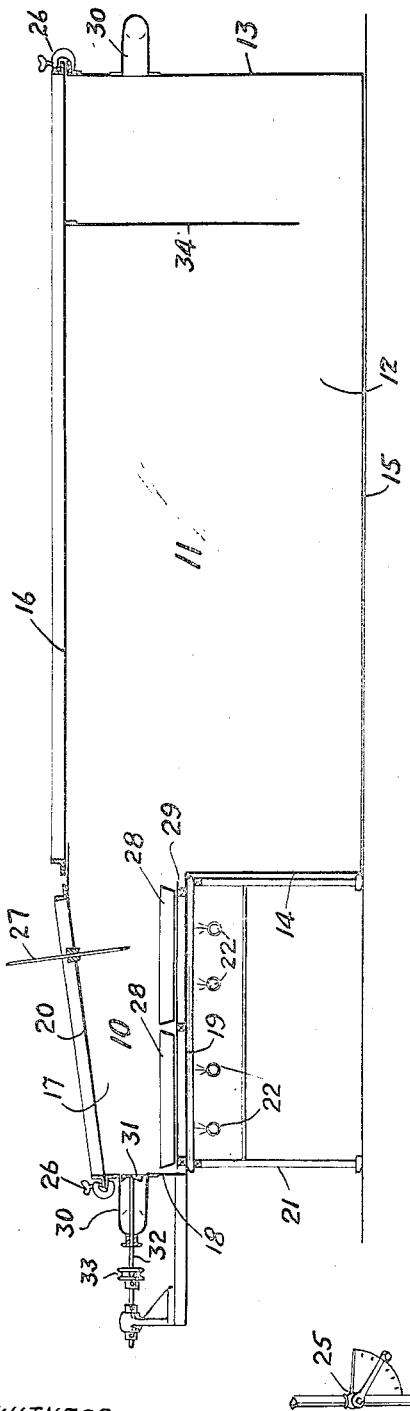
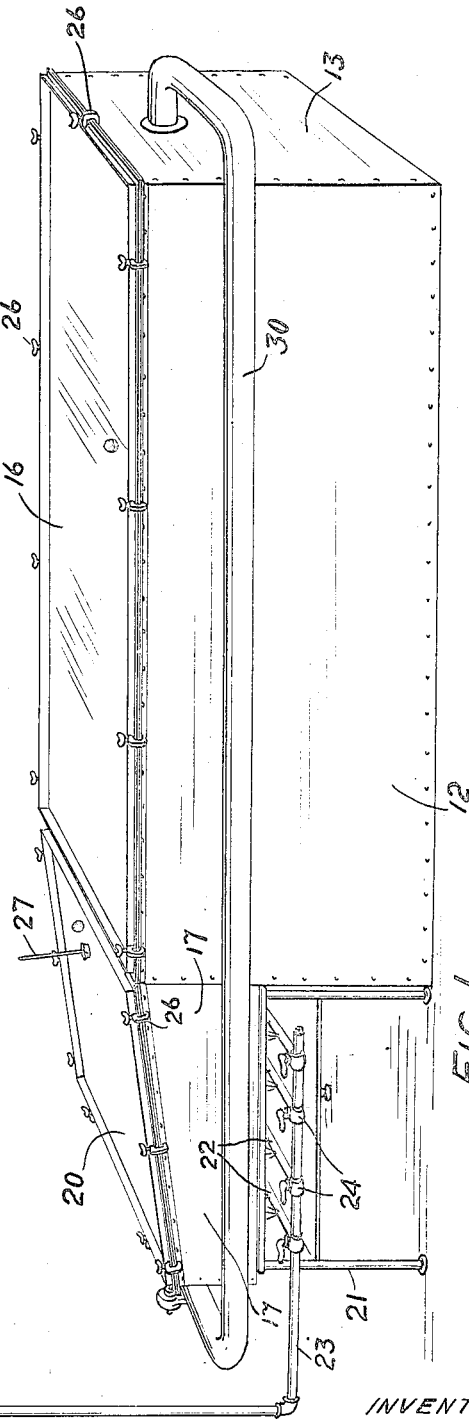
WITNESS:
Robt. R. Kitchel.
INVENTOR
Louis L. Jackson
BY Frank S. Busser
ATTORNEY.

Patented Feb. 27, 1923.

1,446,564

UNITED STATES PATENT OFFICE.

LOUIS L. JACKSON, OF NEW YORK, N. Y., ASSIGNOR, BY MESNE ASSIGNMENTS, TO DISSOSWAY CHEMICAL COMPANY, INC., OF BROOKLYN, NEW YORK, A CORPORATION OF NEW YORK.

SUBLIMATION APPARATUS.

Application filed January 11, 1921. Serial No. 436,449.

*To all whom it may concern:*

Be it known that I, LOUIS L. JACKSON, a citizen of the United States, residing at Richmond Hill, New York city, county of Queens, and State of New York, have invented a new and useful Improvement in Sublimation Apparatus, of which the following is a full, clear, and exact description, reference being had to the accompanying drawings, which form a part of this specification.

This invention relates to sublimation apparatus and more particularly to apparatus of this character for subliming resorcine to produce a substantially pure product, as well as an apparatus in which substantially all of the resorcine contained in the charge will be driven off and collected therein.

The apparatus comprises a heating chamber communicating with a condensing chamber within the apparatus, which is formed of suitable metal or at least lined with a metal such as zinc, which will not have a deleterious effect on the resorcine. The heating chamber is located at one end of the apparatus, which for convenience I will term the front end, the bottom thereof is above the bottom of the condensing chamber and is so located that the entire rear end of said heating chamber is in direct communication with the upper portion of the front of the condensing chamber. Both of said chambers are provided with removable covers for supplying a new charge to the heating chamber and for the removal of the finished product from the condensing chamber, and which covers are secured in position to seal both chambers to prevent the entrance of air thereto or the exit of vapors therefrom, when the device is in operation.

The charge is placed in pans, which are supported within the heating chamber in such a manner that the bottoms of the pans are out of direct contact with the bottom of the heating chamber, which is heated by any suitable means, such as gas burners, to heat the charge. The pans are held out of contact with the bottom of the chamber to prevent overheating the bottoms of the pans which might occur if the pans were directly supported thereon, as well as to provide a space between the pans and the walls of the chamber so that the different portions of the pan or pans will be heated to approximately the same temperature by the heat radiated through the vapors in the chamber and not by direct contact with the metal exposed to heat.

The rear end of the condensing chamber near the top thereof is connected to the front of the heating chamber by a return conduit in which is located a power driven fan to maintain a gentle, even and continuous circulation of the vapors over the pans, through the condensing chamber and back to the heating chamber.

Extending into the heating chamber, preferably relatively near that end thereof communicating with the condensing chamber, is a thermometer, whereby the temperature of the vaporized resorcine, just before it leaves the heating chamber, may be ascertained by the operator, and which temperature can be controlled by regulating the supply of gas to the burners under the heating chamber.

Near the rear end of the condensing chamber and extending downward, but terminating above, the floor of the condensing chamber, is a baffle plate, which obstructs the free passage of vaporized resorcine to the return conduit, while permitting the passage of any vapors that fail to condense.

The precise nature of my invention will be best understood by reference to the accompanying drawings, which will now be described; it being premised, however, that changes may be made in the details of construction without departing from the spirit and scope of my invention as defined in the appended claims.

Fig. 1 of the drawings is a perspective view of one form of apparatus built in accordance with my invention.

Fig. 2 is a longitudinal sectional view through the apparatus.

In these drawings, the reference character 10 designates the heating chamber and 11 the condensing chamber, the front end of the former being in direct communication with the rear end of the latter, the communication being free and unobstructed.

The condenser is built up of galvanized iron and consists of sides 12, a rear end 13, a front end 14, a bottom 15 and a cover 16. The heater forms an extension or nose of the condenser and is formed of sides 17, a front 18, a bottom 19 and a cover 20. The front end 14 of the condenser may be made integral with the heater. The rear edges of the sides 12 of the condenser are secured along their rear edges to the rear end 13, which is the same height as the sides, while the lower portions of the front edges of said sides are secured to the end 14. The bottom edges of the front 14, rear 13 and sides 12 are secured to the bottom 15. The vertical edges of the sides 17 of the heater are secured to the front 18 of the heater and the upper portions of the sides 12 of the condenser; while the bottom of the heater is connected to the lower edges of the sides 17 and front 18 of the heater and to the top edge of the front 14 of the condenser, if such front end is made integral with the condenser.

These joints are all riveted and made airtight to prevent leakage from the apparatus as well as to exclude air therefrom, during the process of sublimation, which would have a deteriorating effect on the resorcine.

The heating chamber is not wholly supported from the condenser, but is also partially supported by a suitable framework 21, which also supports four gas burners 22 which are arranged to heat the bottom 19 of the heating chamber. 23 is a gas supply pipe for the burners 22, 24 are cocks for regulating the supply of gas to the individual burners, and 25 is a graduated control valve for controlling the admission of gas to the pipe 23.

The upper edges of the sides and ends of the entire apparatus are reinforced by means of angle bars which are riveted thereto, so that one of their flanges will form seats for the covers, while the edges of the covers 16 and 20 are also reinforced with similar angle bars so positioned that their horizontal flanges will seat on horizontal flanges on the sides and ends of the structure.

The rear edge of the cover 20 extends beyond and underlies the front edge of the cover 16, as clearly shown in Fig. 2.

The joints between the covers and between the covers and body of the structure are suitably packed, and when the device is in operation the covers are clamped in position by suitable clamps, such as the clamps 26.

27 is a thermometer mounted in the cover 26, the bulb of which is located above the charge holding pans 28 in the chamber 10, and preferably nearer the rear than the front of the chamber, while the graduated portion of said thermometer is above the cover, so that the operator can readily note the temperature of the vapor within the apparatus. The pans 28 are supported on a false bottom 29, which is supported on spacers on the bottom 19 to provide an air space between the bottom 19 (which is directly heated by the burners 22) and the bottoms of the pans, so that the pans will be heated by the vapor instead of by direct contact with the bottom 19.

30 is a conduit connecting the rear of the condensing chamber 11 with the front of the heating chamber 10. 31 is a fan on the shaft 32 within the mouth of the conduit 30 and is arranged to be rotated by means of a pulley 33, which is connected by means of a belt to any suitable power shaft. 34 is a baffle plate within the rear portion of the condenser and extends from the cover 16 to a point relatively close to, but spaced some inches from, the bottom, to compel the current of vapor to flow in a circuitous path through the device and permit of the condensation of the largest practicable fraction of condensable vapors.

As can be seen from Fig. 2, the bulb of the thermometer is so situated that it will not contact with the charge in either of the pans, but is so located that it will be affected by the vapor rising from the pans in its passage to the condenser. I have discovered that a more even heat control can be obtained by placing the thermometer in the path of the hot vapor than can be obtained if the bulb is in contact with the charge, which will cause variations due to variations in the depth of the charge, as well as the compactness thereof.

During the carrying out of one of the steps of the process of treating resorcine, such as disclosed in the application of Thurston N. Dissosway, Serial No. 430,418, filed December 13, 1920, the charge is placed in the pans 28, and the covers placed and secured in position. The valve 25 is then opened a predetermined amount, the burners 22 are ignited, and the fan 31 is set in motion.

The heating of the pans will slowly vaporize the charge, the vapor passing from the chamber 10 through the chamber 11 under the baffle 34 and back to the chamber 10, through the conduit 30. The fan 31 will maintain a continuous and even circulation in the above described direction, which will conduct the vapor from the pans over the bulb of the thermometer and in a circuitous path through the condenser, and during the passage of the vapor through the condenser, the resorcine will be condensed from the vapor and fall on the bottom 15 in front of the baffle 34, while the non-condensable vapor with perhaps a very small portion of condensable vapor will be conducted back to the heating or subliming chamber 10.

As set forth in the above mentioned application, it requires about twenty-four hours to charge, treat and empty the apparatus after a batch has been treated; and after a batch has been treated, the covers 16 and 20 are removed, the crystals are removed from the bottom 15, and fresh resorcine is added to the unvaporized impurities (containing more or less resorcine) remaining on the pans 28. The process is then repeated. By noting the condition of the residue in the pans when the device is first placed into operation, the operator can soon get the valves or cocks 24 adjusted with relation to each other to equally heat all portions of the bottoms of the pans, so that, after such adjustments are made, the temperature or gas supply is entirely controlled by the graduated valve 25; adjustments of the valves or cocks 24 being made to adjust one burner relative to the other.

Having now fully described my invention, what I claim and desire to protect by Letters Patent is:

1. A sublimation apparatus comprising a heating chamber, a condensing chamber opening at one end into the heating chamber and forming a continuation thereof, a conduit connecting the other ends of said chambers, means to support a charge of material to be treated within said heating chamber, means to heat the charge, and means for causing the vapor to circulate in a continuous manner and at a predetermined rate from the heating chamber to the condensing chamber and from the condensing chamber through the conduit, so as to continuously carry the heated vapor from the heating chamber and return to the heating chamber any uncondensable vapor and also any condensable vapor that has escaped condensation.

2. A sublimation apparatus comprising a heating chamber, a condensing chamber opening at one end into the heating chamber and forming a continuation thereof, the cross-sectional area of the heating chamber gradually increasing in diameter from the one end toward the end opening into the condensing chamber, a conduit connecting the other ends of said chambers, means to support a charge of material to be treated within said heating chamber, means to heat the charge, means for varying the heating of one portion of the charge with relation to another portion thereof, and means for causing the vapor to circulate in a continuous manner and at a predetermined rate through said apparatus.

3. A sublimation apparatus comprising a heating chamber, a condensing chamber opening at one end into the heating chamber and forming a continuation thereof, a conduit connecting the other ends of said chambers, means to support a charge of material to be treated within said heating chamber, a plurality of gas burners for heating the charge, individual controlling devices for each burner, a gas supply pipe, a graduated valve in said pipe for simultaneously controlling the supply of gas to all of the burners, and means for causing the vapor to circulate in a continuous manner and at a predetermined rate through both chambers.

4. A sublimation apparatus comprising a heating chamber, a condensing chamber opening at one end into the heating chamber, a conduit connecting the other ends of said chambers, means to support a charge of material to be treated within said heating chamber, means to heat the charge, means for causing the vapor to circulate in a continuous manner and at a predetermined rate through both chambers, and a thermometer within the heating chamber suspended out of contact with the charge and in the path of the vapor adjacent to the opening into the condensing chamber.

5. A sublimation apparatus having a chamber with an offset at one end, the main portion of the chamber being considerably greater in cross-sectional area than the offset, while the cross-sectional area of the offset gradually diminishes from the body of the chamber to the end of the offset, a conduit connecting the ends of the chamber to each other, means to support a charge to be heated within the offset, means to heat the offset, and means for causing a circulation of vapor over the charge from the end of the offset through the body of the chamber and from the end of the body of the chamber back to the end of the offset in a continuous manner and at a predetermined rate to carry the vapor rising from the charge into the body of the chamber in which it is partially condensed while the uncondensed vapor is returned to the offset and again passed over the charge.

6. A sublimation apparatus having a chamber with an offset at one end, the main portion of the chamber being considerably greater in cross-sectional area than the offset, while the cross-sectional area of the offset gradually diminishes from the body of the chamber to the end of the offset, a conduit connecting the ends of the chamber to each other near the upper portions thereof, means to support a charge to be heated within the offset, means to heat the offset, means for causing a circulation of vapor over the charge from the end of the offset through the body of the chamber and from the end of the body of the chamber back to the end of the offset in a continuous manner and at a predetermined rate to carry the vapor rising from the charge into the body of the chamber in which it is partially condensed while the uncondensed vapor is returned to the offset and again passed over the charge, and a baffle near the end of the body of the chamber to cause the vapor to flow downwardly and then upwardly to the conduit.

In testimony of which invention, I have hereunto set my hand at Richmond Hill, N. Y., on this 6 day of January, 1921.

LOUIS L. JACKSON.